United States Patent [19]
Naito et al.

[11] Patent Number: 5,656,307
[45] Date of Patent: Aug. 12, 1997

[54] INJECTION MOLD FOR FORMING A CABINET ASSEMBLY

[75] Inventors: Ryoji Naito, Tokyo; Yumi Imaizumi, Saitama; Scott Pinizzotto, Tokyo, all of Japan

[73] Assignee: Sony Corporation, Tokyo, Japan

[21] Appl. No.: 490,899

[22] Filed: Jun. 16, 1995

[30] Foreign Application Priority Data

Jun. 24, 1994 [JP] Japan ................... 6-164946

[51] Int. Cl.$^6$ ............................... B29C 45/30
[52] U.S. Cl. .................. 425/572; 264/297.2; 264/328.8
[58] Field of Search ................ 425/572; 264/297.2, 264/328.8, 238

[56] References Cited

U.S. PATENT DOCUMENTS

4,909,725  3/1990  Ward ................................ 425/572

Primary Examiner—Tim Heitbrink
Attorney, Agent, or Firm—Jay H. Maioli

[57] ABSTRACT

This invention provides a cabinet assembly which can be created as a single body, including an enclosure and accessory components attached to the enclosure, requiring no additional molds to form the accessory components separately, thereby reducing the cost of molding the accessory components, the number of molding processes and, as a result the total cost. A shut-off valve provided on a mold allows one of the accessory components to be selected for integration with the enclosure as a single body according to the specifications of the particular equipment, thus enabling the particular accessory component to be molded at the same time as the enclosure.

6 Claims, 7 Drawing Sheets

INJECTION MOLD FOR FORMING A CABINET ASSEMBLY

BACKGROUND OF THE INVENTION

1. Field of the Invention

The present invention relates to a cabinet assembly comprising an enclosure and accessory components installed on the enclosure to form a single body.

2. Description of Related Art

In a television receiver, for example, there are two types of output audio specifications: stereo specifications and monophonic specifications. The only difference in external appearance between such television receivers having the same size, the same various functions, etc. is typically the number of speakers for sound output. To be more specific, the number of speakers can be one or two. In the case of a television receiver with stereo specifications, a pair of speakers are provided at the front lower part of an enclosure thereof. In the case of a television receiver with monophonic specifications, on the other hand, only one speaker is provided on either side of the front lower part of an enclosure thereof. For this reason, we think that the enclosure in the configuration of such television receivers can be made common to both the stereo and monophonic specifications by allocating a space that would otherwise be used for a speaker to other components in the case of single speaker specifications.

Figure 6A:
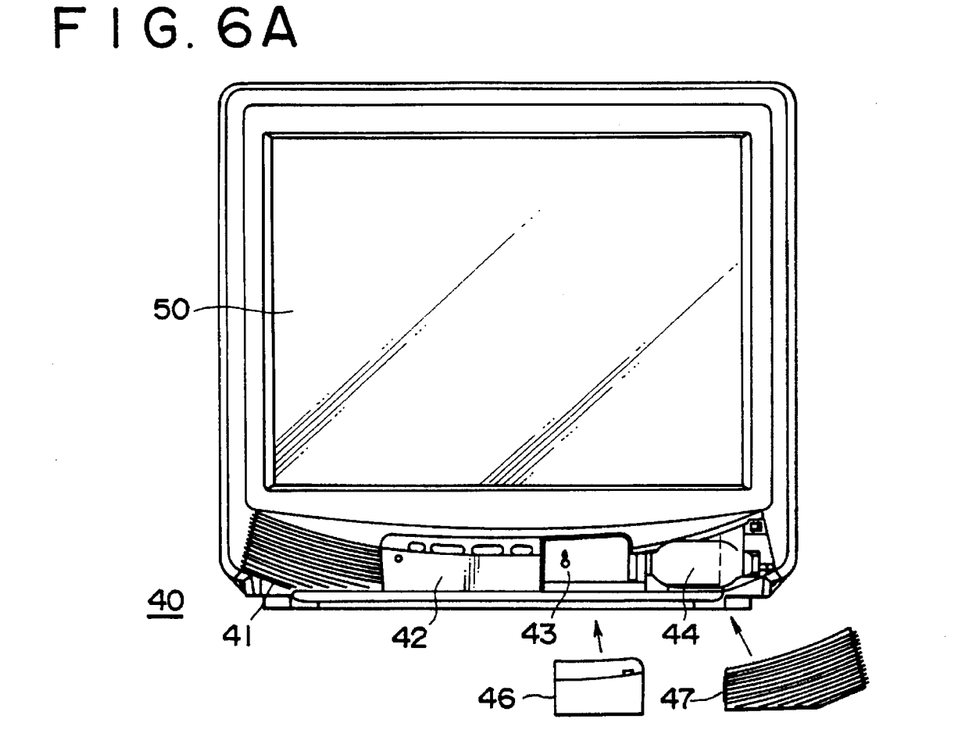
FIGS. 6A and 6B are diagrams showing a typical enclosure of a relevant television receiver.
Figure 6B:
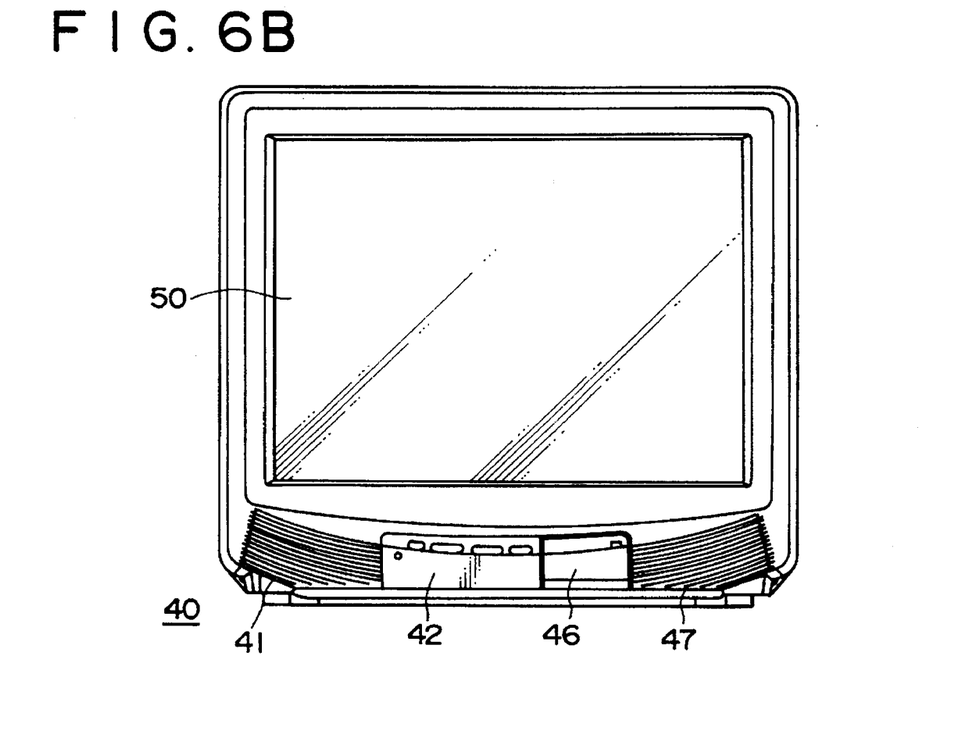
Figure 7A:
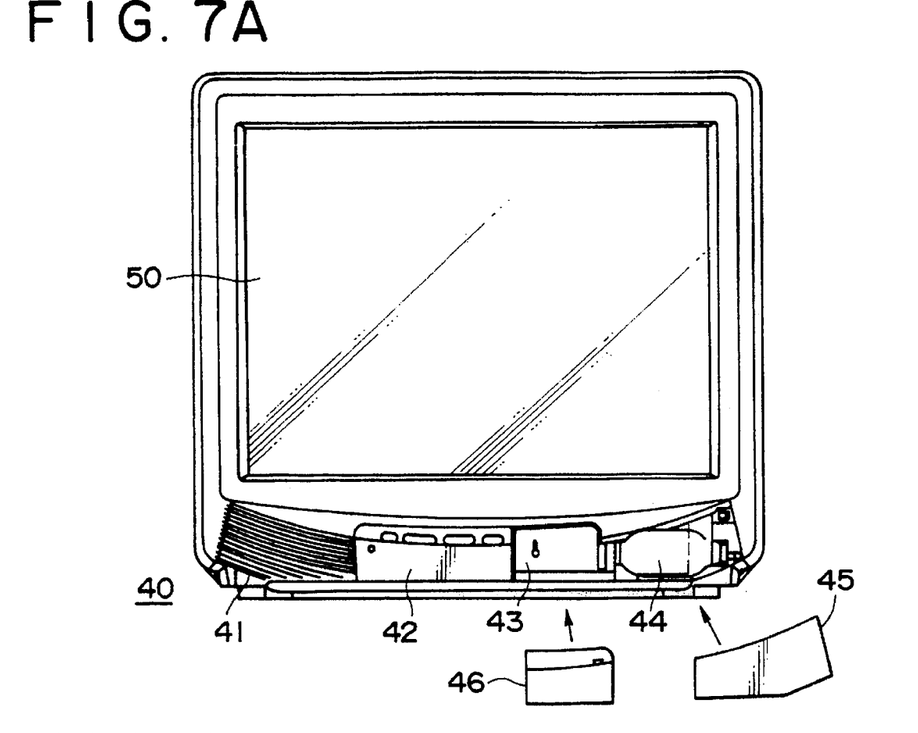
FIGS. 7A and 7B are diagrams showing a typical enclosure of a relevant television receiver.
Figure 7B:
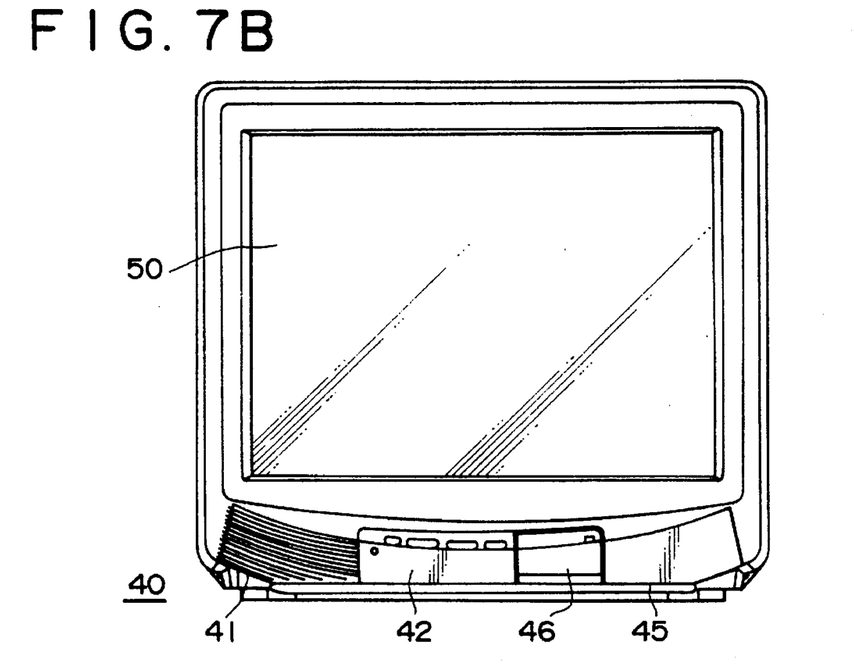

FIGS. 6A and 6B and FIGS. 7A and 7B show a front view of a front enclosure of a television enclosure. FIGS. 6A and 6B show a typical front enclosure for stereo specifications whereas FIGS. 7A and 7B show a typical front enclosure for monophonic specifications. It should be noted that the enclosure has a configuration common to both the stereo and monophonic specifications as described earlier.

Reference numeral 40 shown in these figures is the front enclosure which is referred to hereafter simply as an enclosure. Reference numeral 41 is a speaker grill for covering a right audio speaker of a stereo television receiver or a monophonic audio speaker. Reference numeral 42 is an operation unit having a hole through which a variety of controls protrude outward. Reference numeral 43 is an operation unit having openings used typically for an earphone terminal and the like. Reference numeral 44 is a speaker hole for placing a left audio speaker only in the case of a television receiver with stereo specifications. Reference 46 is a cover attached to the terminal unit 43 which can be closed and opened and used as a component common to both the stereo and monophonic television receivers. Reference numeral 50 is an opening to which a CRT is installed.

Reference numeral 47 shown in FIGS. 6A and 6B denotes a left speaker grill for a left audio speaker. In the case of a television receiver having stereo specifications, the speaker grill 47 is installed on the speaker hole 44 as shown in FIG. 6B for protecting the left audio speaker which is not shown in the figures. Reference numeral 45 shown in FIG. 7A and 7B is a panel installed on the speaker on the hole 44, as shown in FIG. 7B, for concealing the speaker hole 44 in the case of a television receiver having monophonic specifications. It should be noted that the panel 45 and the left speaker grill 47 are each manufactured as a separate component using a separate mold.

Although the enclosure 40 can be made common to both the stereo and monophonic specifications concerning the audio output specifications which differ from each other, components such as the panel 45 and the left speaker grill 47 must be each manufactured as a separate component tailored to either the stereo or monophonic specifications. That is to say, in the case of a television receiver having stereo specifications, the left speaker grill 47 is made. In the case of a television receiver having monophonic specifications, on the other hand, the panel 45 is made. As a result, molds created specifically for either the left speaker grill 47 or the panel 45 are required.

Moreover, the seperately molded enclosure 40 with the left speaker grill 47 and the panel 45 may be procured from different mold manufacturers. In this case, the setting of the mold on the molding equipment during the process of injecting resin into the mold and other mold related procedures may inevitably vary from mold to mold, giving rise to a problem that the manufacture of the left speaker grill 47 or the panel 45 is cumbersome.

SUMMARY OF THE INVENTION

In order to solve the problems described above, the present invention provides a cabinet assembly comprising an enclosure and accessory components attached to the cabinet assembly which is created by linking the accessory components to be attached to the enclosure to runners from predetermined members on the enclosure to form a single body.

In addition, only those accessory components according to the equipment specifications are integrated into the enclosure in order to form a single cabinet assembly by limiting the flow of resin injected into a mold using a shut-off valve provided on the mold.

For example, since a front enclosure constitutes a single assembly in conjunction with accessory components attached to the front enclosure, the front enclosure and the accessory components can be created at the same time by using the same mold. As a result, the number of molds used in molding processes can be reduced.

As described above, since the cabinet assembly provided by the present invention can be created as a single body comprising an enclosure and accessory components attached to the enclosure, special molds for forming the accessory components separately are not required any more. Accordingly, the cost of molding the accessory components and the number of molding processes can be reduced. As a result, the total cost can be brought down.

A shut-off valve provided on a mold allows one of the other components to be selected for integration with the enclosure into a single body. For example, only an accessory component which is selected in accordance with the specifications of the particular equipment comprising the enclosure can thus be molded at the same time as well. In addition since the enclosure and the other component are created to form a single cabinet assembly, the present invention offers the advantage that the efficiency of transportation to move components from a molding process to an assembly process can also be improved.

DETAILED DESCRIPTION OF THE PREFERRED EMBODIMENTS

Embodiments implementing a cabinet assembly provided by the present invention as a front enclosure of a television receiver are described by referring to FIGS. 1 to 5 as follows.

Figure 1:
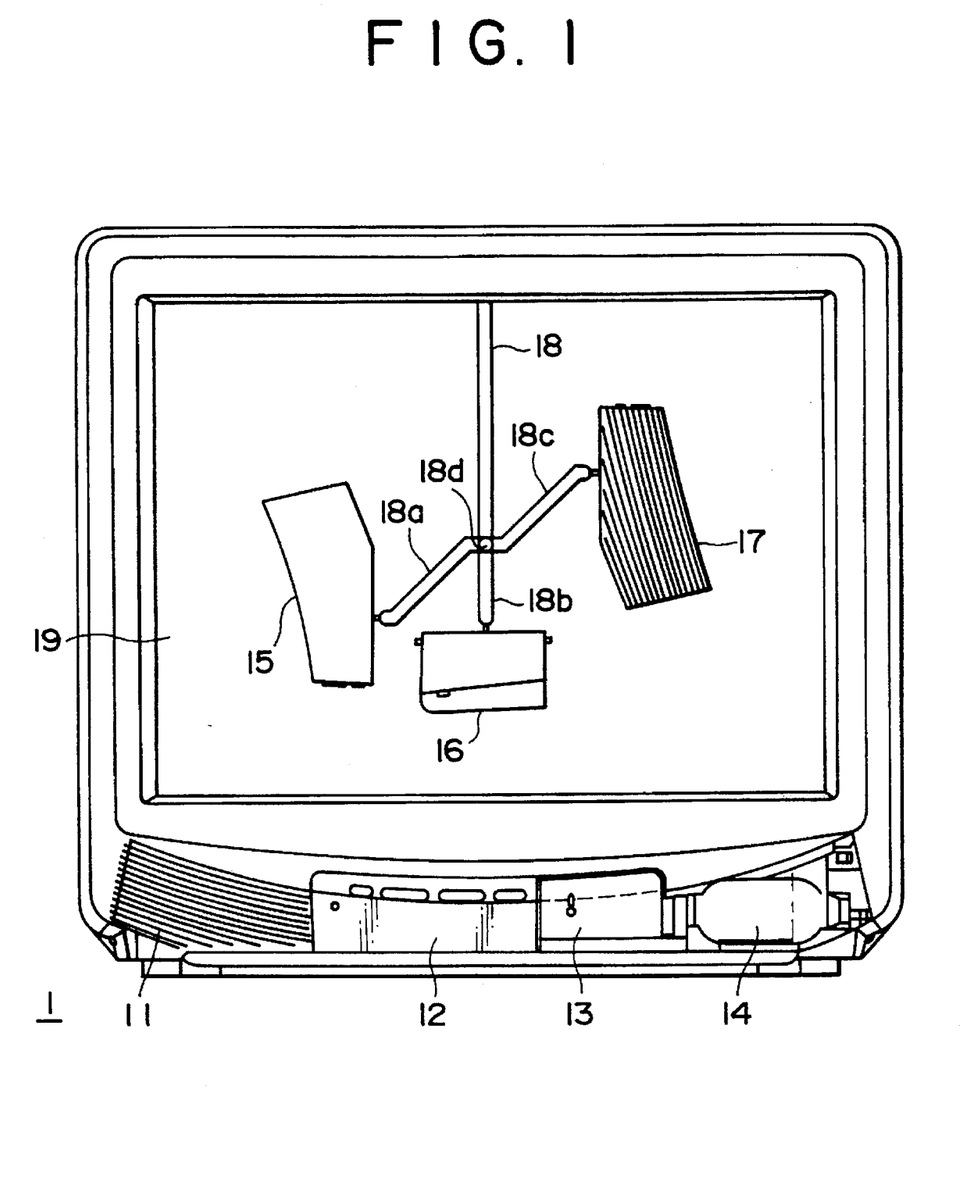
FIG. 1 is a front view of the enclosure, a typical embodiment provided by the present invention.

FIG. 1 is a front view of a front enclosure of a television receiver provided by the present invention. Reference numeral 1 shown in the figure is a front enclosure, referred to hereafter simply as an enclosure, having accessory components integrated thereto. Reference numeral 11 is a grill, whereas reference numeral 12 denotes an operation unit. Reference numerals 13 and 14 denote a terminal unit and a speaker hole, respectively. The grill 11, the operation unit 12, the terminal unit 13 and the speaker hole 14 correspond to the grill 41, the operation unit 42, the terminal unit 43 and the speaker hole 44 shown in FIGS. 6A and 7A, respectively. Reference numerals 15, 16, and 17 are a panel, a cover, and a grill, respectively. The panel 15, the cover 16 and the grill 17 are formed at end runners 18a, 18b, and 18c, respectively of a runner 18 extended from the back of the enclosure 1 as will be described later. Reference numeral 18d is an injection track, a portion injected by resin in the process of molding the enclosure 1 as will be described later by referring to FIG. 5.

It should be noted that all portions of the enclosure 1 are created to form a single body by means of the same mold.

The present invention provides a single cabinet assembly comprising typically the enclosure 1 and accessory components such as the panel 15, the cover 16 and the grill 17 integrated with the enclosure 1 to form a single body as shown in FIG. 1. In order to obtain the accessory components separately, the runner 18 is first typically cut off from the enclosure 1. Then, the accessory components are separated from the runner 18 to be individually used.

In the case of an enclosure 1 to be employed in a television receiver having stereo specifications, the cover 16 and the grill 17 are installed in the terminal unit 13 and the speaker hole 14, respectively as shown in FIGS. 6A and 6B, while the panel 15 which can not be installed in the enclosure 1 is stored typically as a service part. In the case of an enclosure 1 to be employed in a television receiver having monophonic specifications, on the other hand, the cover 16 and the panel 15 are installed in the terminal unit 13 and the speaker hole 14, respectively as shown in FIGS. 7A and 7B, while the grill 17 which can not be installed in the enclosure 1 is stored typically as a service part.

In addition, according to the present invention, a shut-off valve to be described later is used to prevent injected resin from flowing to a specific part of the mold during a molding process, allowing only the grill 17 or only the panel 15 to be created.

Figure 2:
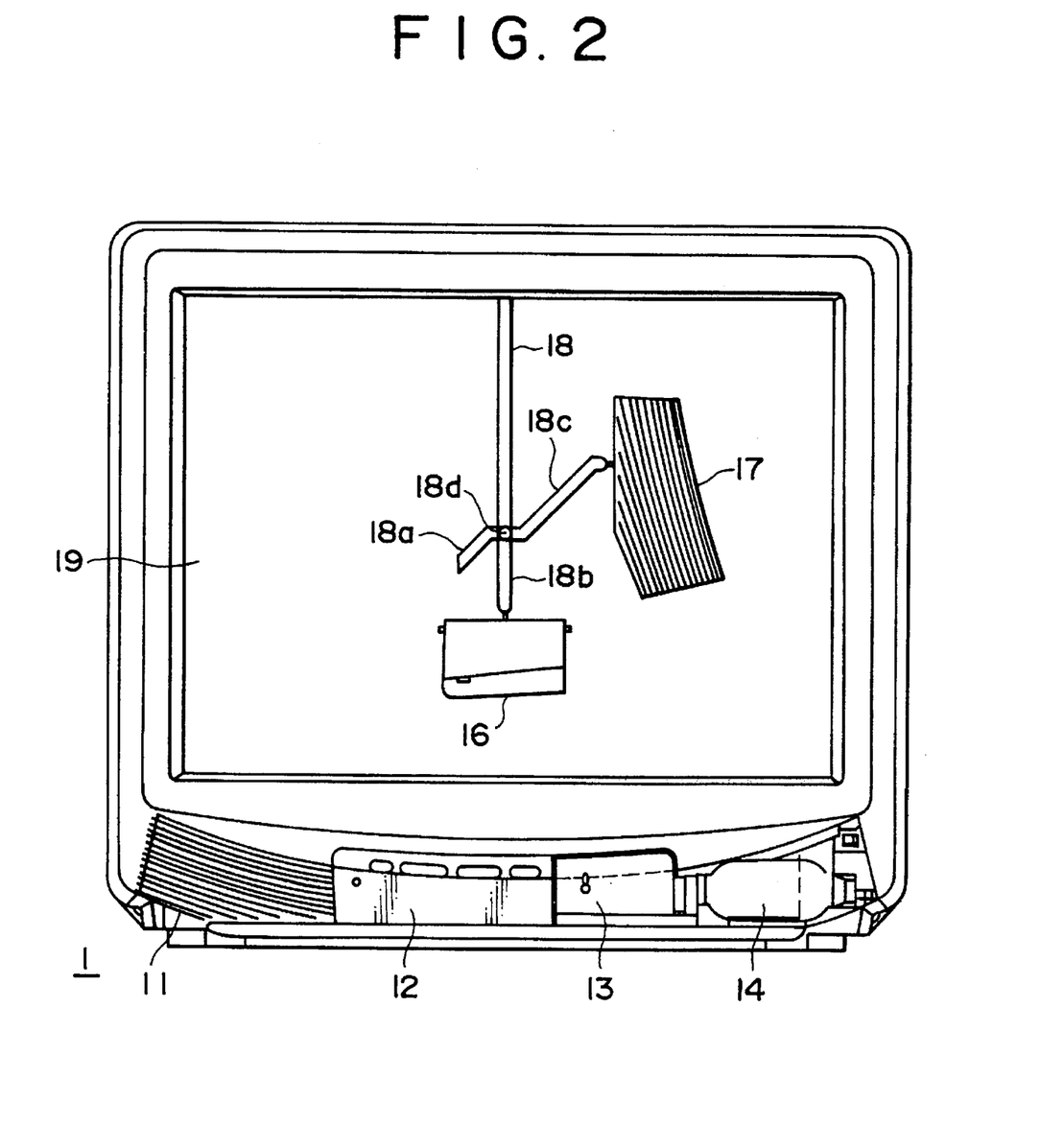
FIG. 2 is a front view of the enclosure, a typical embodiment provided by the present invention.
Figure 3:
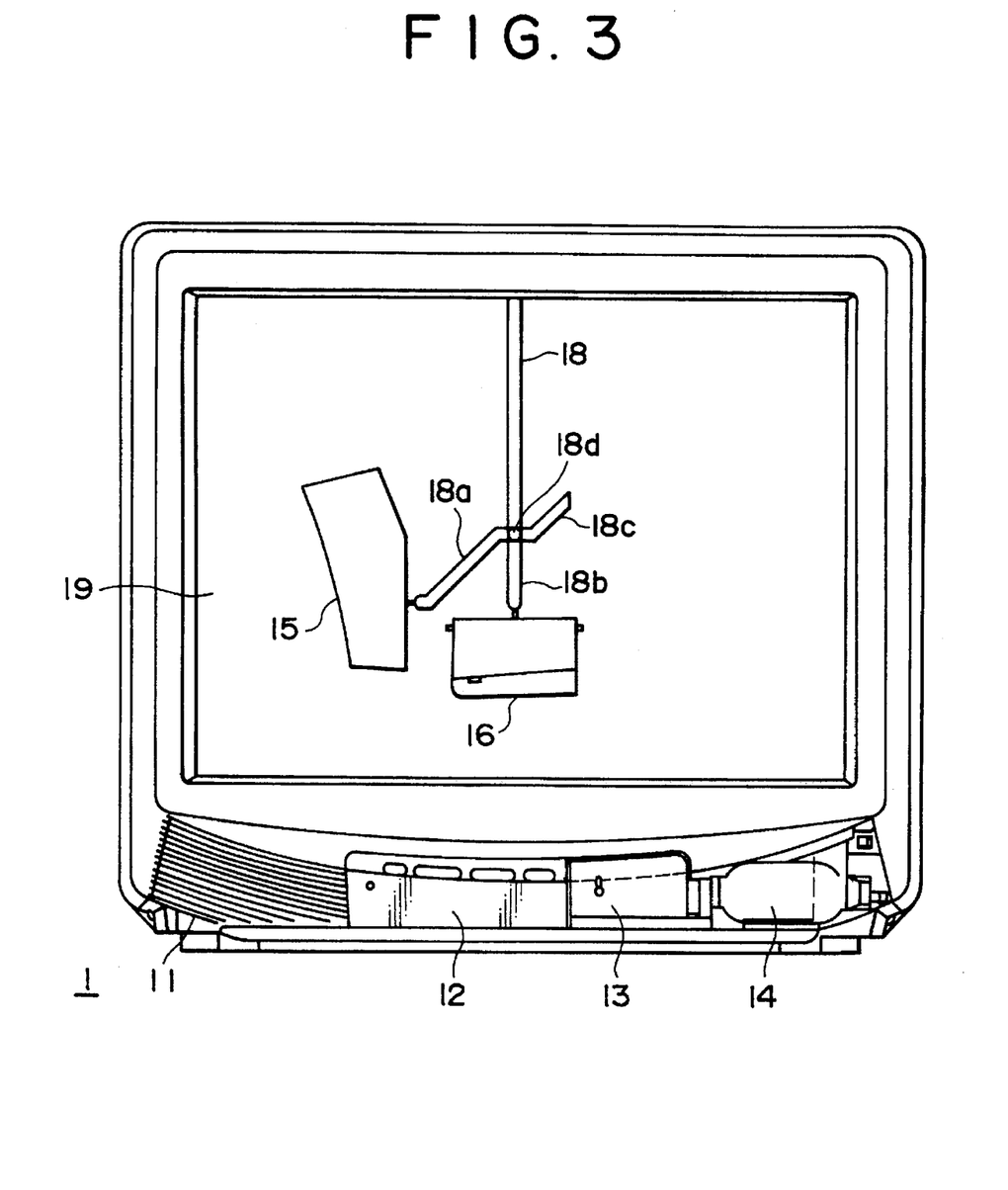
FIG. 3 is a front view of the enclosure, a typical embodiment provided by the present invention.

FIG. 2 is a front view of the enclosure 1 with only the grill 17 molded thereon. The enclosure 1 shown in this figure is to be employed in a television receiver having stereo specifications. Unlike what is described above, the figure shows an example of molding in which the panel 15 is not created as a service part and, thus, only the cover 16 and the grill 17 are molded on the runner 18. In the case of an enclosure 1 to be employed in a television receiver having monophonic specifications, on the other hand, only the cover 16 and the panel 15 are molded on the runner 18 as shown in FIG. 3.

It should be noted that since the cover 16 is a required component regardless of whether the specifications are stereo or monophonic and, thus, is always molded along with the enclosure 1 at the same time, a shut-off valve does not have to be provided on the runner 18a.

Next, an outline of a shut-off valve is described. As described earlier, a shut-off valve provided in the mold is opened or closed for limiting the flow of resin when either a panel 15 or a grill 17 is molded at the same time as the enclosure 1 as shown in FIGS. 2 or 3.

Figure 4A:
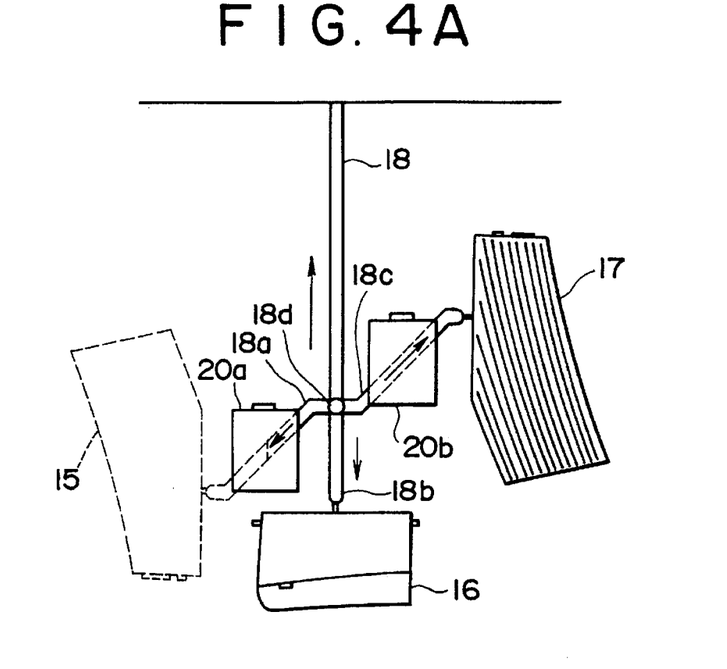
FIGS. 4A and 4B are schematic diagrams showing shut-off valves used in the molding of predetermined accessory components.
Figure 4B:
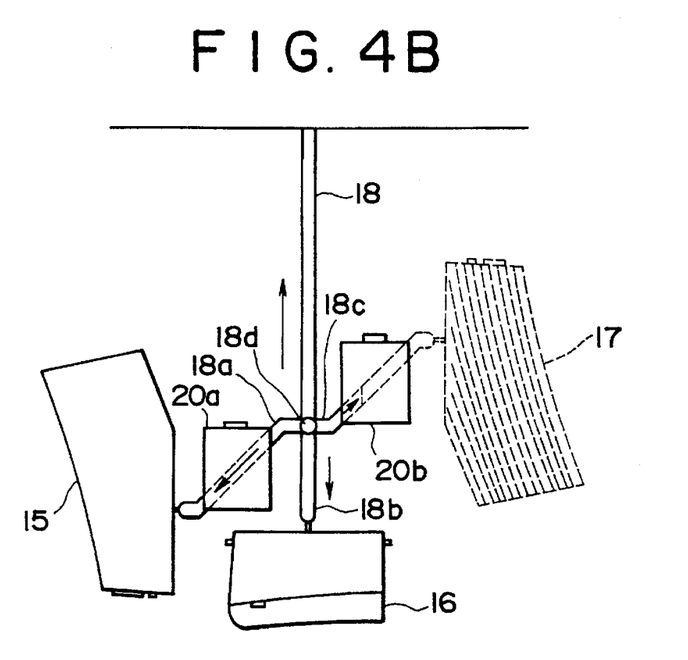

FIGS. 4A and 4B are diagrams showing shut-off valves in a mold for creating the enclosure 1. FIGS. 4A and 4B schematically illustrate the stages of molding the enclosure 1 shown in FIGS. 2 and 3, respectively. Reference numerals 20a and 20b shown in FIGS. 4A and 4B each denote a shut-off valve. The shut-off valve 20a is located typically in the middle of the end runner 18a. By closing the shut-off valve 20a typically using a tightening bolt, the flow of resin injected to a member for molding the panel 15 can be stopped. Likewise, the shut-off valve 20b is located typically in the middle of the end runner 18c for preventing injected resin from flowing to a member for molding the grill 17.

For, for example, resin can be injected with the shut-off valve 20a in a closed state while the shut-off valve 20b is in an opened state as shown in FIG. 4A. In these states, the enclosure 1 can be molded with only the grill 17 created thereon as shown in FIG. 2.

On the other hand, for example, resin can be injected with the shut-off valve 20a in an opened state while the shut-off valve 20b is in a closed state as shown in FIG. 4B. In these states, the enclosure 1 can be molded with only the panel 15 created thereon as shown in FIG. 3.

Figure 5:
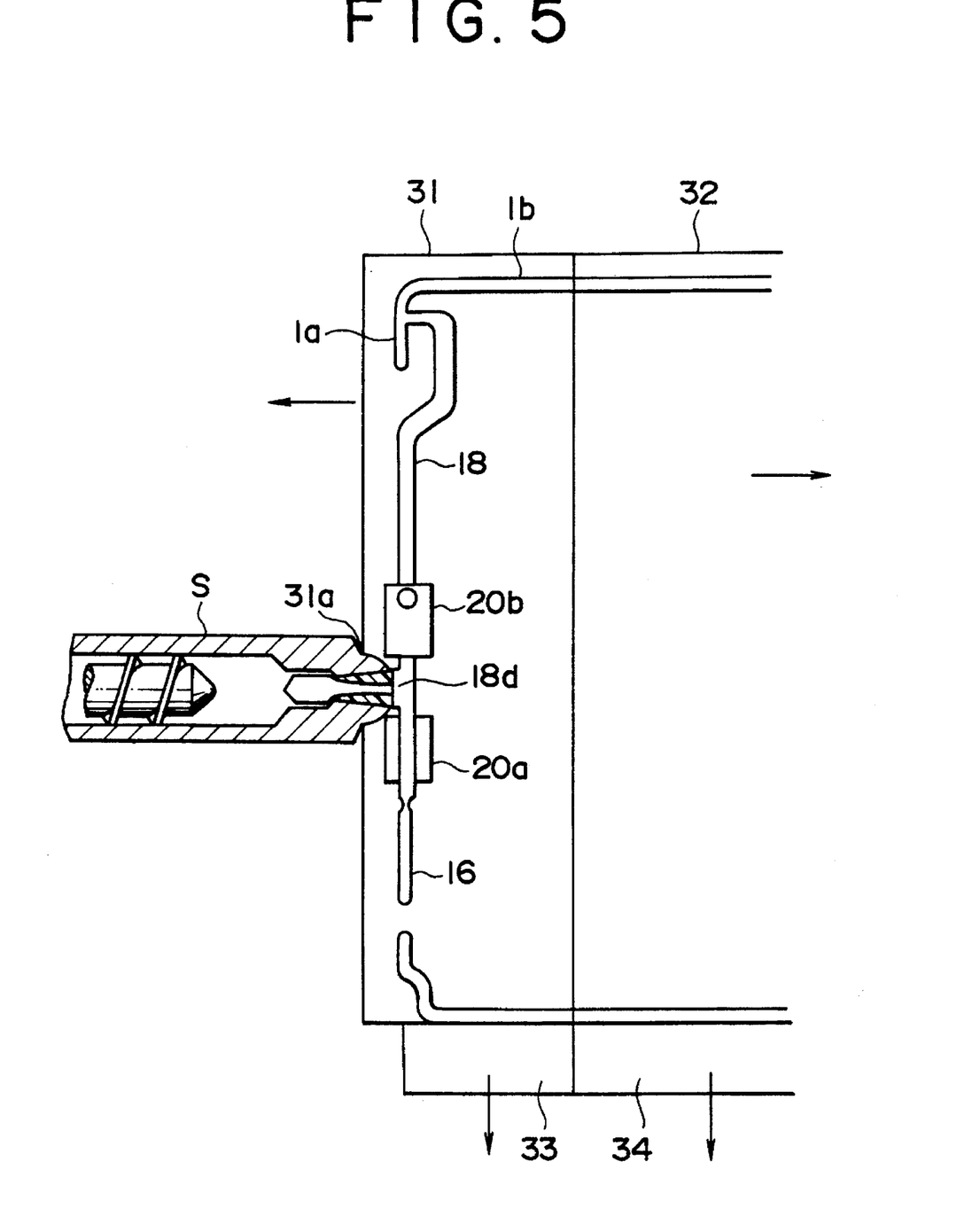
FIG. 5 is a diagram showing a side view of an enclosure being molded in accordance with the present invention.

FIG. 5 is a side view of the enclosure 1 being molded in a mold by injection of resin. Components identical with those shown in FIGS. 4A and 4B are denoted by the same reference numerals and their description is not repeated here. Reference numerals 1a and 1b denote a front plate and a top plate of the enclosure 1, respectively. Reference numerals 31 to 34 each denote a mold component. Reference numeral 31a is a resin injection hole provided on the mold component 31 and notation S denotes a cylinder for injecting resin to the mold components 31 to 34 through the injection hole 31a.

Resin for creating the enclosure 1 injected from the cylinder S to the injection hole 31a first flows into a member for creating the runner 18 on the mold component 31. At that time, if the shut-off valve 20a is in an opened state as shown in FIG. 4A, only the panel 15 is created. With the shut-off valve 20b in an opened state as shown in FIG. 4B, on the other hand, only the grill 17 is created. In addition, the cover 16 is always created regardless of whether the shut-off valves 20a and 20b are opened or closed.

As the cover 16 is created and the panel 15 and/or the grill 17 are created depending upon the states of the shut-off valves 20a and 20b, the resin flows from the runner 18 through a portion on the back side, which is a continuation of the front plate 1a and the top plate 1b, to members for creating the front plate 1a, the top plate 1b, a side plate and a bottom plate. Subsequently, components such as the grill 11, the operation unit 12, the terminal unit 13 and the speaker hole 14 shown in FIGS. 1 through 3 are created to form a single assembly.

As the resin injected from the cylinder S in the way described above hardens, the mold components 32 to 34 are removed in directions indicated by arrows, in FIG. 5 allowing the enclosure 1 to be taken out from the mold component 31.

As described above, by closing or opening the shut-off valves 20a and 20b, three types of enclosure 1 like the ones shown in FIGS. 1 through 3 can be molded by means of the same mold. That is to say, when different accessory components such as the panel 15 or the grill 17 need to be created, it is not necessary any more to remove the current mold from an assembly being molded and to reinstall another mold, resulting in an increased work efficiency of the molding process.

In the embodiment explained so far, the panel 15 and the grill 17 are typical accessory components in addition to the cover 16 for creating a single assembly according to whether the specifications are stereo or monophonic. It should be noted, however, that other components can also be included as accessory components whenever necessary for creating a single assembly in conjunction with the enclosure 1.

In addition, the scope of the present invention is not limited to the enclosure 1 of a television receiver as provided by the preferred embodiment. The present invention can also be applied to the assembly of a cabinet for all kinds of equipment as long as the cabinet is made up of molded components.

What is claimed is:

1. A mold for molding a single cabinet assembly comprising a plurality of assembly components, comprising:

a cylinder for injecting a resin material for forming said plurality of assembly components;

a first mold component into which said resin material is injected from said cylinder to form a first one of said plurality of assembly components;

a second mold component into which said resin material is injected from said cylinder to form a second one of said plurality of assembly components;

a third mold component into which said resin material is injected from said cylinder to form a third one of said plurality of assembly components, wherein said third mold component is substantially larger in size than said first and second mold components and said first and second mold components are positioned inside said third mold component at locations substantially along a centerline of said third mold component; and first and second control valves mounted on said third mold component for controlling the flow of said resin material into said first and second mold components, respectively.

2. A mold according to claim 1, further comprising means for selecting one of said first and second control valves for controlling the flow of said resin material.

3. A mold according to claim 2, wherein a runner for injecting said resin material is provided between said first, second and third mold components and said first and second control valves are mounted on said runner.

4. A mold according to claim 3, wherein said first and second mold components have external shapes substantially identical to each other.

5. A mold according to claim 4, wherein said first and second mold components are positioned at locations symmetrical to a centerline of said third mold component.

6. A mold according to claim 5, wherein said first and second mold components are positioned at locations point-symmetrical to the center of said third mold component.

* * * * *

UNITED STATES PATENT AND TRADEMARK OFFICE
CERTIFICATE OF CORRECTION

PATENT NO. : 5,656,307
DATED : August 12, 1997
INVENTOR(S) : Ryoji Naito, Yumi Imaizumi and Scott Pinizzotto It is certified that error appears in the above-indentified patent and that said Letters Patent is hereby corrected as shown below:

In the Abstract, line 7, after "result" insert --,--
    Col.2, line 50, after "addition" insert --,--

<u>In the claims</u>:
    Col.6, line 22, after "second" first occurrence, insert --,--

Signed and Sealed this

Twenty-third Day of June, 1998

Attest:

BRUCE LEHMAN

*Attesting Officer*      *Commissioner of Patents and Trademarks*